United States Patent [19]

Ruggier et al.

[11] Patent Number: 4,771,646
[45] Date of Patent: Sep. 20, 1988

[54] ROTATING AND INDEXING MECHANISM

[75] Inventors: Michael Ruggier, Richmond, England; Sandy Cow, Newburgh; Robert O. Lilley, Aberdeen, both of Scotland

[73] Assignee: Vetco Gray Inc., Houston, Tex.

[21] Appl. No.: 334

[22] Filed: Jan. 5, 1987

[51] Int. Cl.$^4$ .............................................. F16H 27/02
[52] U.S. Cl. .................................. 74/129; 74/813 R; 409/221
[58] Field of Search ...................... 74/813 R, 825, 826, 74/129, 88; 409/221

[56] References Cited

U.S. PATENT DOCUMENTS 3,965,775  6/1976  Pinkesfeld ..................... 74/813 R X Primary Examiner—Eugene F. Desmond
Attorney, Agent, or Firm—Joseph R. Dwyer

[57] ABSTRACT

A rotating and indexing mechanism (10) having two spaced apart, rows of toothed profiles (48, 52) which form camming surfaces for two spaced apart rows (62, 64) of cam followers (32). The toothed profiles (48, 54) and cam followers (32) are such that when there is relative movement between the toothed profiles (48, 54) and the rows (62, 64) of cam followers (32) in one direction, the camming action of the cam followers and toothed profiles pause incremental rotation of a shaft (16). A groove (66) is also provided for locking the two profiles and cam followers together when the desired incremental (index) position is reached.

Two embodiments are shown, one where the toothed profiles are moved axially to give rotation to the cam followers and shaft, and the other where the cam followers move axially to give rotation to the toothed profiles and the shaft.

6 Claims, 4 Drawing Sheets

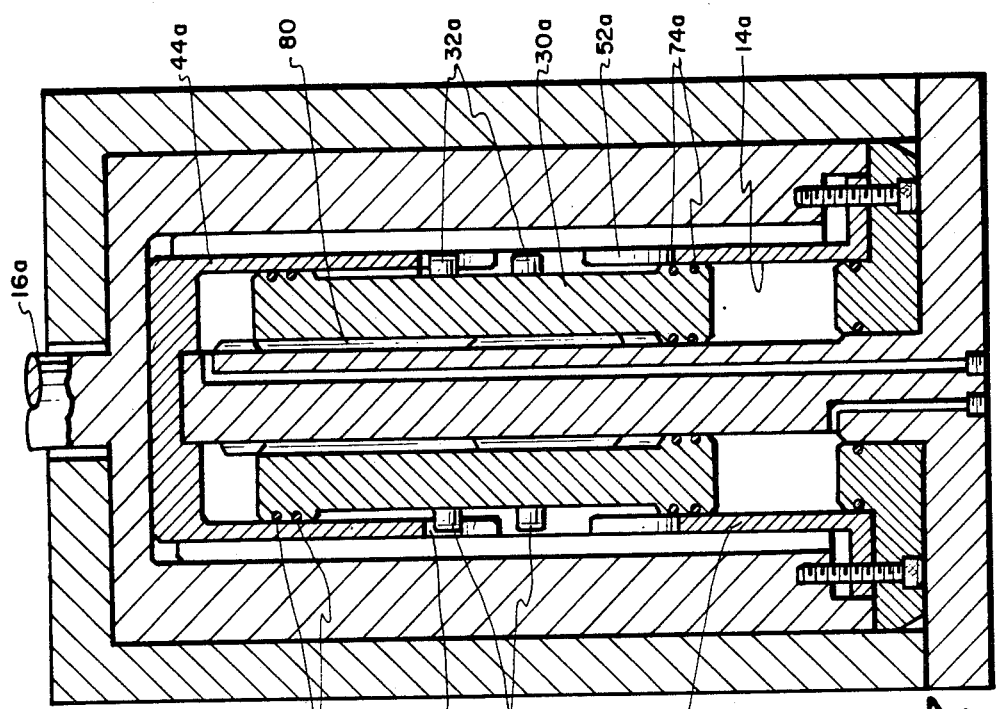
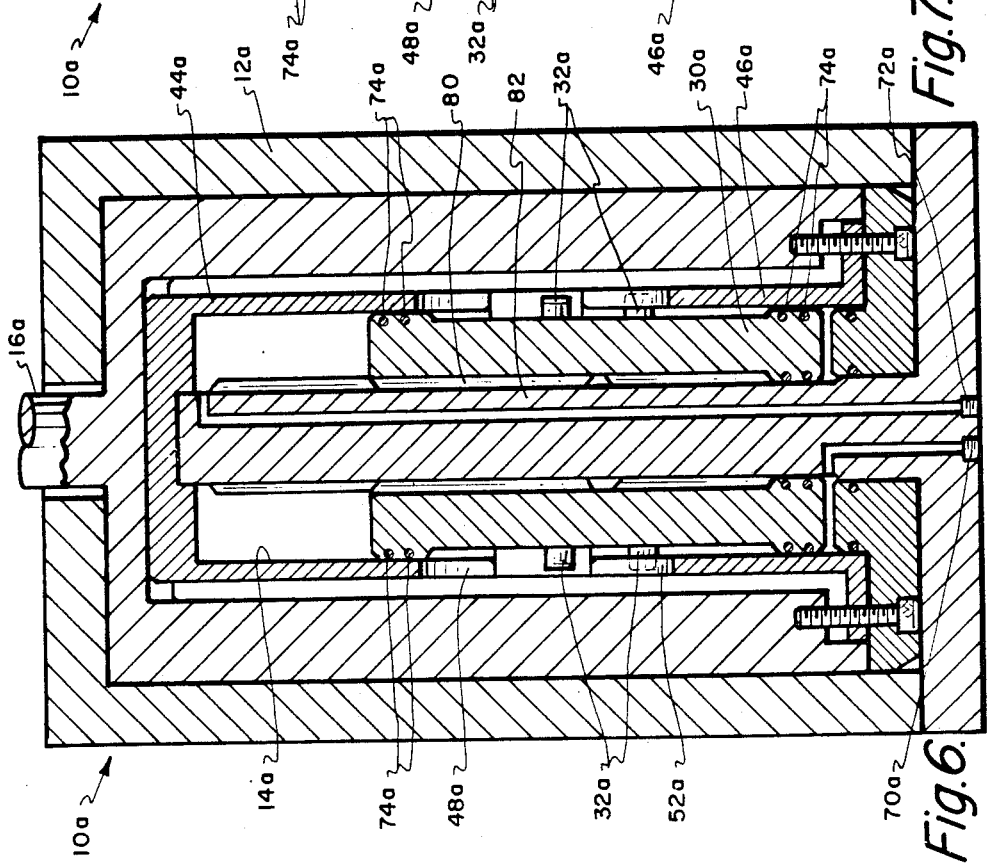

ROTATING AND INDEXING MECHANISM

BACKGROUND OF THE INVENTION

This invention relates to rotating and indexing mechanisms applicable to a number of applications that require a mechanism to rotate one component, such as a table, relative to another component, such as a shaft, through a number of equally spaced divisions or stations.

A number of indexing mechanisms exist to simplify and speed up manufacturing processes such as to support and rotate a product for drilling, tapping, and the like.

However, existing indexing mechanisms have a number of drawbacks that make them unsuitable for many applications. For example:

(1) Most indexing mechanisms rely on a rotating input shaft which generally holds a cam to index a table or section that generally supports cam followers. This is a difficult operation if the input shaft is some distance from the operating position or is subsea. Also, electrical motors and their cables are undesirable subsea.

(2) Electrical and hydraulic motors are not capable of rotating an input shaft the small amount required to cause indexing of just one or two stations but are generally for continuous motion, that is, continuously indexing. Additionally, one can never guarantee the exact position of the selectro.

(3) They do not provide high-positioning accuracy at each station, and (4) They are generally large and bulky, usually comprising three parts, an index box, a reducer, and a drive motor.

SUMMARY OF THE INVENTION

The rotating and indexing mechanism which overcomes the disadvantages of the prior art contains a first and a second toothed profile held in a fixed, spaced apart, position relative to one another. An inner cylindrical rod (shaft), movable relative to the toothed profiles, containing two spaced apart rows of cam followers around its circumference which protrude beyond the profiled teeth. The profile of the teeth and the positioning of the cam followers is such that when there is relative movement in one direction between the shaft and the toothed profiles, the one row of cam followers moves across the angled profiles of one row of teeth causing relative rotation of the shaft and toothed profiles. When there is relative movement in a second direction between the shaft and the toothed profiles the second row of cam followers make contact with the second row of teeth and again the angled profile of the teeth causes rotation between the shaft and toothed profiles in the same direction as before. Additionally, at this point, when displacement between the shaft and toothed profiles is at a maximum, the cam followers slide into a locking groove to provide final alignment and locking of the two components.

There are two embodiments of this rotating and indexing mechanism. In one, the shaft and the cam followers (which are not allowed to rotate) are moved axially to give rotation to the toothed profiles which are attached to the component that requires indexing and, in the second, the toothed profiles (which are not allowed to rotate) are moved axially to give rotation of the shaft and the cam followers which are fixed to the component that requires indexing.

BRIEF DESCRIPTION OF THE DRAWINGS

FIGS. 6 and 7 are cross-sectional views similar to FIGS. 1 and 2 but showing the second embodiment of the invention, namely, the concept of holding the toothed profiles axially stationary but moving the cam followers.

DETAILED DESCRIPTION

Preferred Embodiment

Figure 2:
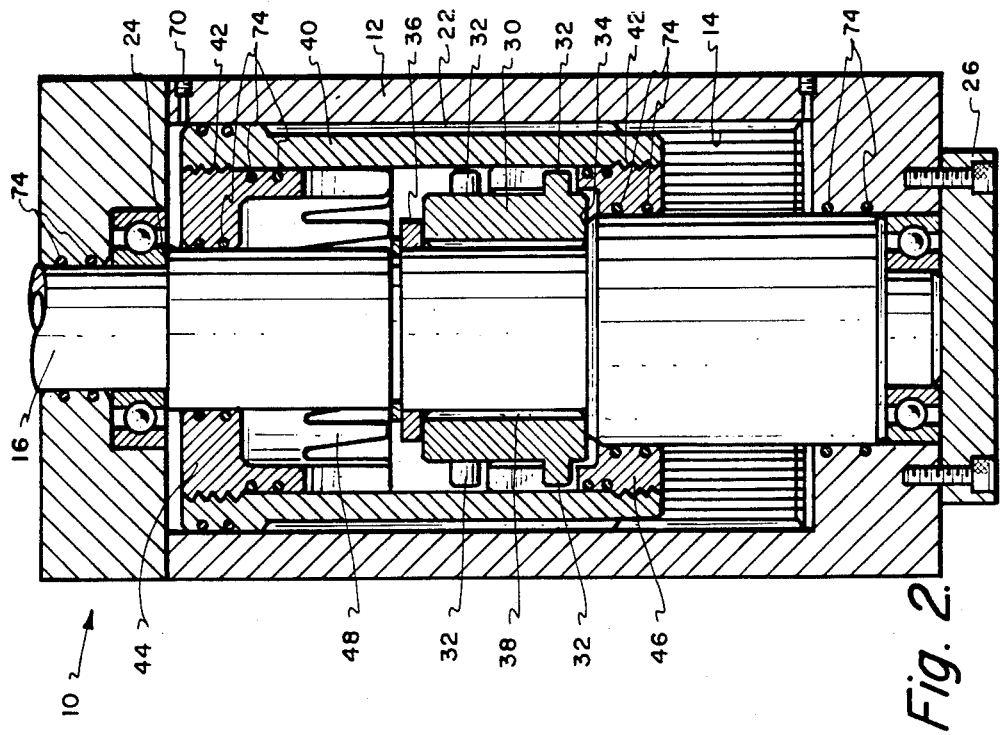
FIGS. 1 and 2 are elevational, partially cross-sectional, views of the first embodiment of the invention showing the rotatable but axially stationary cam followers and the rotatable but axially movable piston actuated toothed profiles.
Figure 1:
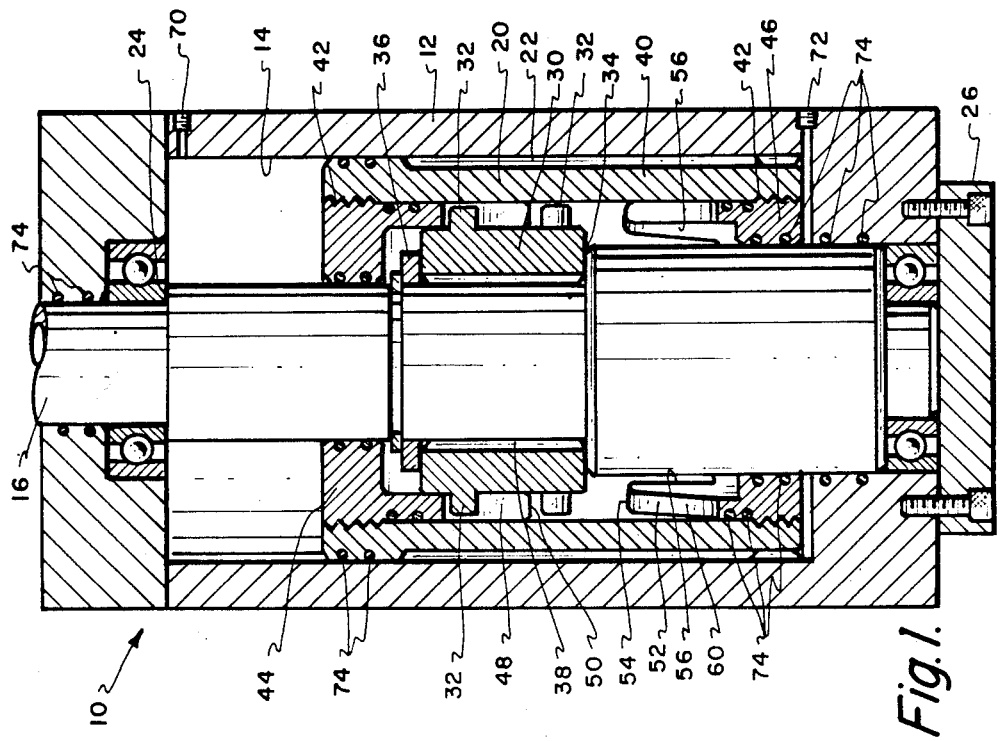

Turning now to particularly FIGS. 1 through 4, it can be seen that the rotating and indexing mechanism 10 of this invention comprises a housing 12 with a cylindrical inner wall 14 defining a piston chamber with a shaft 16 centrally thereof but spaced from the inner wall 14 to allow for a piston 20 slidable axially slidable on said shaft. The shaft 16 is adapted to rotate relative to the housing 12 and suitable anti-friction bearings are provided while the piston 20 is held against rotation relative to the housing by splines 22. A shoulder 24 and the bearings prevent axial movement of the shaft relative to the housing. The housing is, of course, closed at both ends with one end having a detachable plate 26 to facilitate assembly and either the housing or the shaft may be attached to the component to be indexed.

Centrally and within the piston 20 is a relatively short sleeve 30 with radially, outwardly extending cam followers 32. The sleeve 30 is positioned on a shoulder 34 formed by a reduced portion on the shaft and is held in place against the shoulder by a lock ring assembly 36. The sleeve is also fixed against rotation relative to the shaft by axial splines 38. Thus, the shaft 16, sleeve 30 and cam followers 32 do not move axially of the housing but are simply allowed to rotate.

Figure 3:
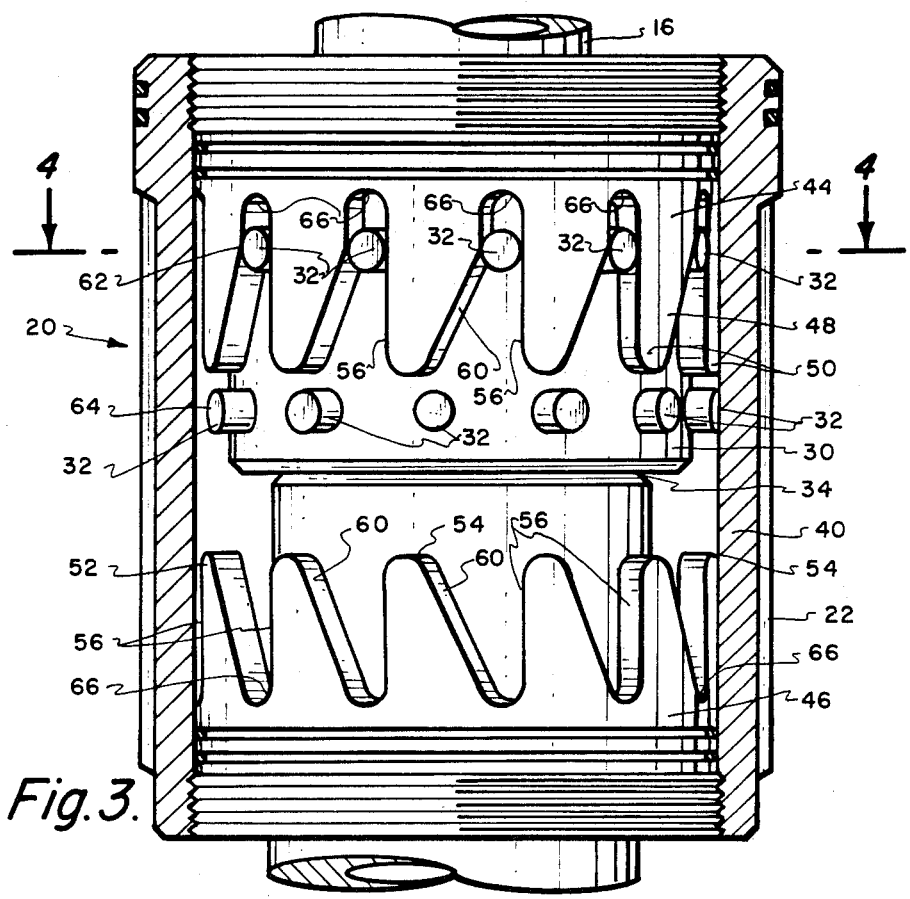
FIG. 3 is an elevational view, with the sleeve holding the toothed profile, shown in section.
Figure 4:
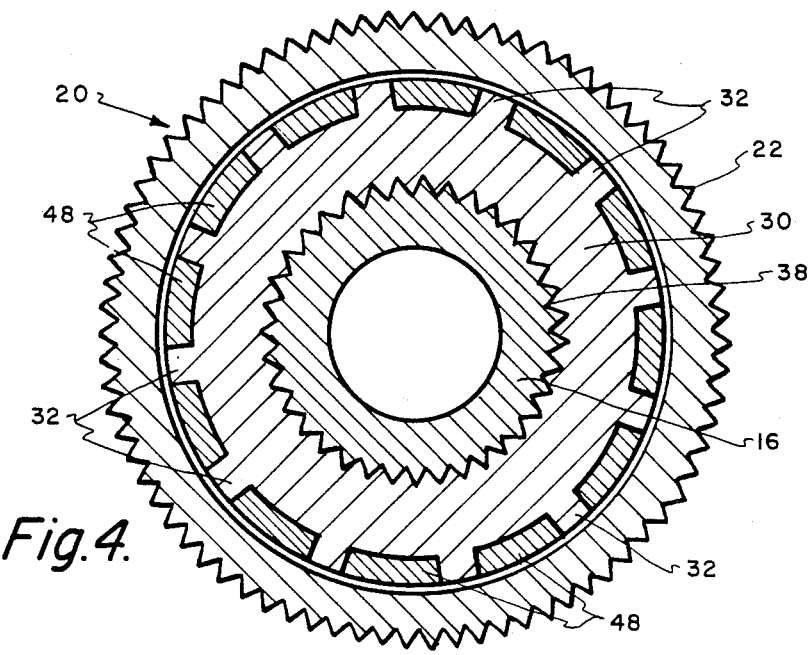
FIG. 4 is a cross-sectional view of the piston part of the rotating and indexing mechanism of this invention taken along line 4—4 of FIG. 3, FIGS. 5a–g are schematic representations of the toothed profiles and cam followers to more clearly illustrate the operation of the invention.

The piston 20 comprises a cylindrical housing 40 which is internally threaded as at 42 at each end to threadably receive a pair of inner sleeves 44 and 46 which form an enclosure for the sleeve 30. The upper inner sleeve 44 contains a row of upper teeth 48 whose apices 50 point downwardly. The lower sleeve 46 contains a row of lower teeth 52 whose apices 54 point upwardly. Each of these teeth is essentially a right triangle with a vertical wall (altitude) 56 and a hypotenuse 60 (30 degrees from the vertical axis). (The terms upwardly, downwardly, upper, lower, and vertical refer to the orientation of the mechanism 10 as oriented in the drawings for reference only.) The vertical wall 56 and the hypotenuse 60 of each triangle are camming surfaces against which the cam followers 32 react to rotate the shaft 16. All vertical walls and hypotenuses of both rows are each axially in line with one another as can be more clearly seen in FIG. 3 and FIGS. 5a–g. FIG. 3 also shows that the cam followers 32 are in two rows 62 and 64 with each cam follower 32 of the top row 62 spaced apart to be received into a locking groove 66 between each of the upper teeth and with each cam follower 32 of the bottom row 64 spaced peripherally with respect to each of the upper row of cam followers to be located on the hypotenuse side of all teeth. Rows 62 and 64 are spaced apart such that, while one or the other of the rows are engaging the cam surfaces, the other row is free to rotate clear of the apices of the teeth.

It is apparent that the cam followers 32 extend radially a distance from the outer diameter of the sleeve 30 at least equal to the thickness of the teeth as to operate in a camming function and, while only pin-like protuberances are shown, the cam followers 32 may be provided with suitable bearings to reduce friction between the cam followers and the camming surfaces.

Finally, to actuate the piston 20, the piston chamber, formed by the cylindrical wall 14 and the piston, is provided with upper and lower ports 70 and 72 which are alternately connected to a source of fluid pressure and exhaust to reciprocate the piston relative to the shaft. Suitable O-ring seals 74 are placed in the mechanism where necessary to prevent leakage.

FIGS. 5a-g show an operational sequence of the rotating and indexing mechanism 10 incrementally rotating and indexing the shaft. Rotation of the shaft is counterclockwise in these figures and to show the displacement of the teeth and cam followers, they have been numbered and provided with alphabetical symbols.

Figure 5A:
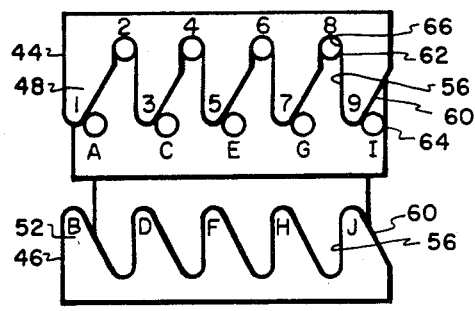

As can be seen in FIG. 5a, the cam follower of the lower row 64 are positioned adjacent the hypotenuse camming surface 60 of each tooth and the cam followers of the upper row 62 are in the top locking groove 66 of the upper sleeve 44. This is the locked or first position.

Figure 5B:
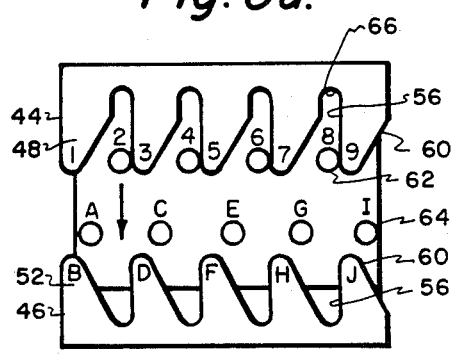

In FIG. 5b the two rows of teeth have moved axially only. The cam followers of the lower row 64 about to be engaged with the hypotenuse camming surface 60 of the teeth 52 on the lower sleeve 46 while the upper row of cam followers still engage the camming surfaces 56.

Figure 5C:
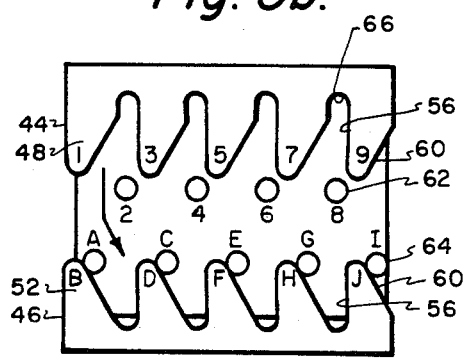
Figure 5D:
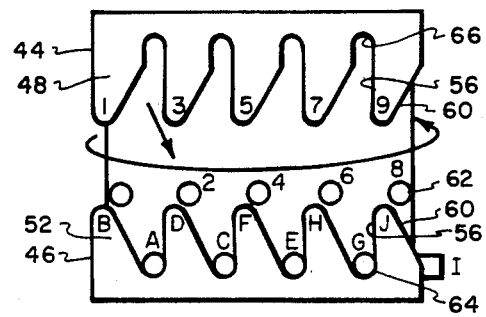

FIG. 5c shows the lower row 64 of cam followers, each being cammed against the hypotenuse camming surface 60 of the lower teeth 52 and also showing the upper row 62 of cam followers free and clear of the upper teeth 48. The lower row of cam followers will cam along the camming surface 60 as the lower teeth move upwardly until they reach the lower grooves between the teeth as shown in FIG. 5d. In this position, the rotation of the shaft is one-half of the desired increment.

Figure 5E:
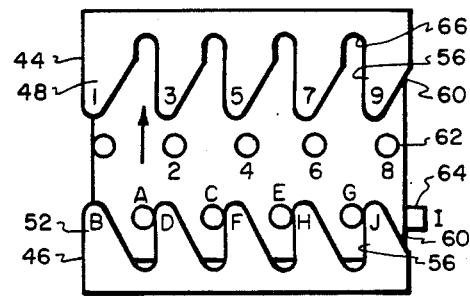
Figure 5F:
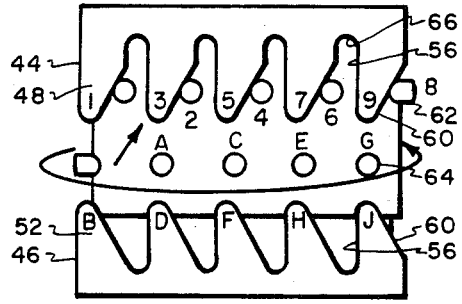
Figure 5G:
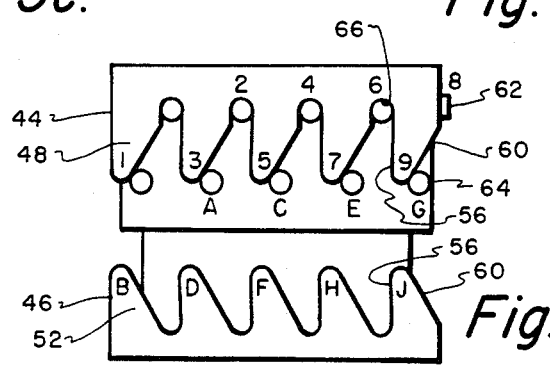

FIG. 5e illustrates the lower row 64 of cam followers moving axially along the camming surface 56 of the lower teeth 52 as the lower sleeve moves downwardly and the upper row of cam followers engaging or about to engage the hypotenuse 60 of the upper teeth 48. As the teeth continue to move downwardly relative to the cam followers, the shaft is again moved counterclockwise until it reaches its final position within the grooves 66 between the teeth as shown in FIG. 5g. This is the same position as FIG. 5a one increment of rotation later.

Second Embodiment

FIGS. 6 and 7 illustrate the second embodiment of the invention in which the toothed profiles are held stationary with respect to the outer housing and the sleeve containing the cam followers is moved axially on suitable splines 80 on a central post 82 forming part of the housing 12a. The shaft 16a is connected to the axially slidable sleeve 30a containing the stationary cam followers 32a which are rotated incrementally as the sleeve 30a is moved axially in response to hydraulic pressure alternately commensurate to the posts 70a and 72a. Since the operation of this embodiment is so similar to the operation of the embodiment described above, each of the parts performing the same function are given the same reference number but with the suffix "a" to simplify the description of this embodiment.

From the foregoing, it can be seen that there is disclosed two embodiments of a rotating and indexing mechanism. The number of toothed profiles and the number of cam followers will vary according to the needs of the user. Also, while there is a right triangle shown as the toothed profile at about 30 degrees from the axial direction, this angle may be varied according to the requirements of the user. Furthermore, it is apparent that the cam followers may be attached directly to the shaft thus eliminating a set of splines if desired.

We claim:

1. In a rotating and indexing mechanism including a housing with a shaft rotatable with respect thereto,
    a first row of cam followers,
    a second row of cam followers spaced from said first row of cam followers,
    a first row of toothed profiles with two camming surfaces,
    a second row of toothed profiles with two camming surfaces spaced from said first row of toothed profiles,
    said camming surfaces on each toothed profile being at an angle to each other,
    means for moving the cam followers and the toothed profiles axially in one direction relative to one another while one row of cam followers is in engagement with one row of tooth profiles so that a second row of cam followers engages a second row of tooth profiles while said camming surfaces rotate said shaft relative to said housing in an amount equal to the angle between said camming surfaces, wherein the axial relative movement between said toothed profiles and said cam followers in said one direction rotates said shaft one-half of the total rotational increment selected and wherein further axial relative movement in a second direction while said cam followers are in engagement with said toothed profiles rotates said shaft the second half of the total rotational increment, and
    means between the rows of toothed profiles which cooperate with one row of said cam followers to lock said shaft and housing against relative rotation when said shaft completes its total rotational increment.

2. The mechanism as claimed in claim 1 wherein each said toothed profile is formed as a right triangle with the altitude forming one camming surface and the hypotenuse forming the other camming surface.

3. The mechanism as claimed in claim 2 wherein each altitude camming surface of the first row of toothed profiles is axially aligned with each of the altitude camming surfaces of the second row of toothed profiles so that relative axial movement between the cam followers and the toothed profiles, while said cam followers engage said altitude profiles, imparts no rotational movement to said shaft.

4. The mechanism as claimed in claim 3 wherein the toothed profiles are held stationary and the cam followers are rotated by said camming surfaces.

5. The mechanism as claimed in claim 3 wherein the toothed profiles are rotated by the cam followers and the cam followers are held stationary.

6. The mechanism as claimed in claim 3 wherein relative movement between said toothed profiles and said cam followers in either direction is responsive to fluid pressure communicated to said housing.

* * * * *